(12) United States Patent
Frank et al.

(10) Patent No.: US 7,562,220 B2
(45) Date of Patent: Jul. 14, 2009

(54) SYSTEM AND METHOD FOR PROGRAMMING AN ISOLATED COMPUTING ENVIRONMENT

(75) Inventors: Alexander Frank, Bellevue, WA (US); Thomas G. Phillps, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 11/109,438

(22) Filed: Apr. 19, 2005

(65) Prior Publication Data

US 2006/0112384 A1    May 25, 2006

Related U.S. Application Data

(63) Continuation-in-part of application No. 11/022,493, filed on Dec. 22, 2004, which is a continuation-in-part of application No. 11/006,837, filed on Dec. 8, 2004, which is a continuation-in-part of application No. 10/989,122, filed on Nov. 15, 2004.

(51) Int. Cl.
*H04L 9/00* (2006.01)
*H04K 1/00* (2006.01)

(52) U.S. Cl. .................. 713/168; 713/169; 380/251

(58) Field of Classification Search ............ 713/168, 713/189; 380/251
See application file for complete search history.

(56) References Cited

U.S. PATENT DOCUMENTS 5,768,382 A * 6/1998 Schneier et al. ............ 380/251

6,463,534 B1 * 10/2002 Geiger et al. ............... 713/168

OTHER PUBLICATIONS

A Malicious Code Immune Model Based on Program Encryption Chen Zemao; Wu Xiaoping; Tang Weimin; Wireless Communications, Networking and Mobile Computing, 2008. WiCOM '08. 4th International Conference on Oct. 12-14, 2008 pp. 1-5.*

Design and implementation of a secure Mobile IP protocol Mufti, M.; Khanum, A.; Networking and Communication, 2004. INCC 204. International Conference on Jun. 11-13, 2004 pp. 53-57.*

UNIX Guardians: active user intervention in data protection Davida, G.I.; Matt, B.J.; Aerospace Computer Security Applications Conference, 1988., Fourth Dec. 12-16, 1988 pp. 199-204.*

Specification of U.S. Appl. No. 10/989,907 filed Nov. 15, 2004.

* cited by examiner

*Primary Examiner*—David Y Jung
(74) *Attorney, Agent, or Firm*—Marshall, Gerstein & Borun LLP

(57) ABSTRACT

A computer is provided with an isolated computing environment. The isolated computing environment is adapted to allow initial programming for use in manufacturing, distribution and sales. The isolated computing environment further allows an authenticated source or authenticated code to update the isolated computing environment with code and configuration data for use in the end-user environment. To encourage final updating, the computer may be placed in a limited-function mode until authorized code is installed and operational. A method and apparatus are disclosed for the sanctioning and secure update of the isolated computing environment.

20 Claims, 5 Drawing Sheets

SYSTEM AND METHOD FOR PROGRAMMING AN ISOLATED COMPUTING ENVIRONMENT

This application is a continuation-in-part of U.S. patent application Ser. No. 11/022,493, filed Dec. 22, 2004 which is a continuation-in-part of U.S. patent application Ser. No. 11/006,837, filed Dec. 8, 2004, which is a continuation-in-part of U.S. patent application Ser. No. 10/989,122, filed Nov. 15, 2004.

BACKGROUND

As discussed in the above-referenced applications, the use of an isolated computing environment, sometimes called a trusted computing base, brings significant capability to managing the operation of a computer, especially a computer used in a pay-per-use or pay-as-you-go business model. When such a computer is in the hands of an end user, the isolated computing environment may represent the interests of a not-present service provider or other interested party. Because the isolated computing environment operates on behalf of the not-present party it must maintain its integrity to represent the interests of that non-present party throughout the manufacturing and delivery process. Programming the isolated computing environment during manufacturing may unnecessarily limit the usefulness of the isolated computing environment to a particular operating environment, such as a particular business logic/policy, application, processor vendor or operating system version. Conversely, programming the isolated computing environment after delivery to an end user may allow the end-user to interfere with the programming of the isolated computing environment to the disadvantage of the service provider.

SUMMARY

According to one aspect of the disclosure, a method and apparatus for configuration and programming of an isolated computing environment uses cryptographic methods for authentication. In one embodiment, the isolated computing environment may be programmed in a secure manufacturing environment prior to release and distribution. In another embodiment, the isolated computing environment is initially programmed with a generic system environment and standard keys. The isolated computing environment may then use the generic system environment and standard keys to authenticate future intermediate or final programming and keys. This level of programming may occur in or out of the secure manufacturing environment. In yet another embodiment, the programming of the isolated computing environment may be deferred beyond the secure manufacturing environment. In this embodiment, the operating system may be responsible for downloading programming from a mass storage device on a routine basis. The isolated computing environment may then be responsible for authentication and authorization of the downloaded data, To accomplish authentication and authorization in the late stages of manufacturing or after delivery to the field, including to an end user, the isolated computing environment may be programmed with setup or transport keys and initial programs to provide specific functionality. The isolated computing environment may then be updated either by a trusted source or with authenticated data later in the delivery cycle. By postponing final programming, the usefulness and flexibility of the isolated computing environment may be greatly expanded. To enforce final programming, a sanction may be imposed on the computer to limit the computer's usefulness until the installation of an approved version of code in the isolated computing environment or if an attempted download fails authentication.

The flexibility of the isolated computing environment may be further enhanced by an application program interface that allows the computer and isolated computing environment to interact across different operating and installation environments.

DETAILED DESCRIPTION OF VARIOUS EMBODIMENTS

Figure 1:
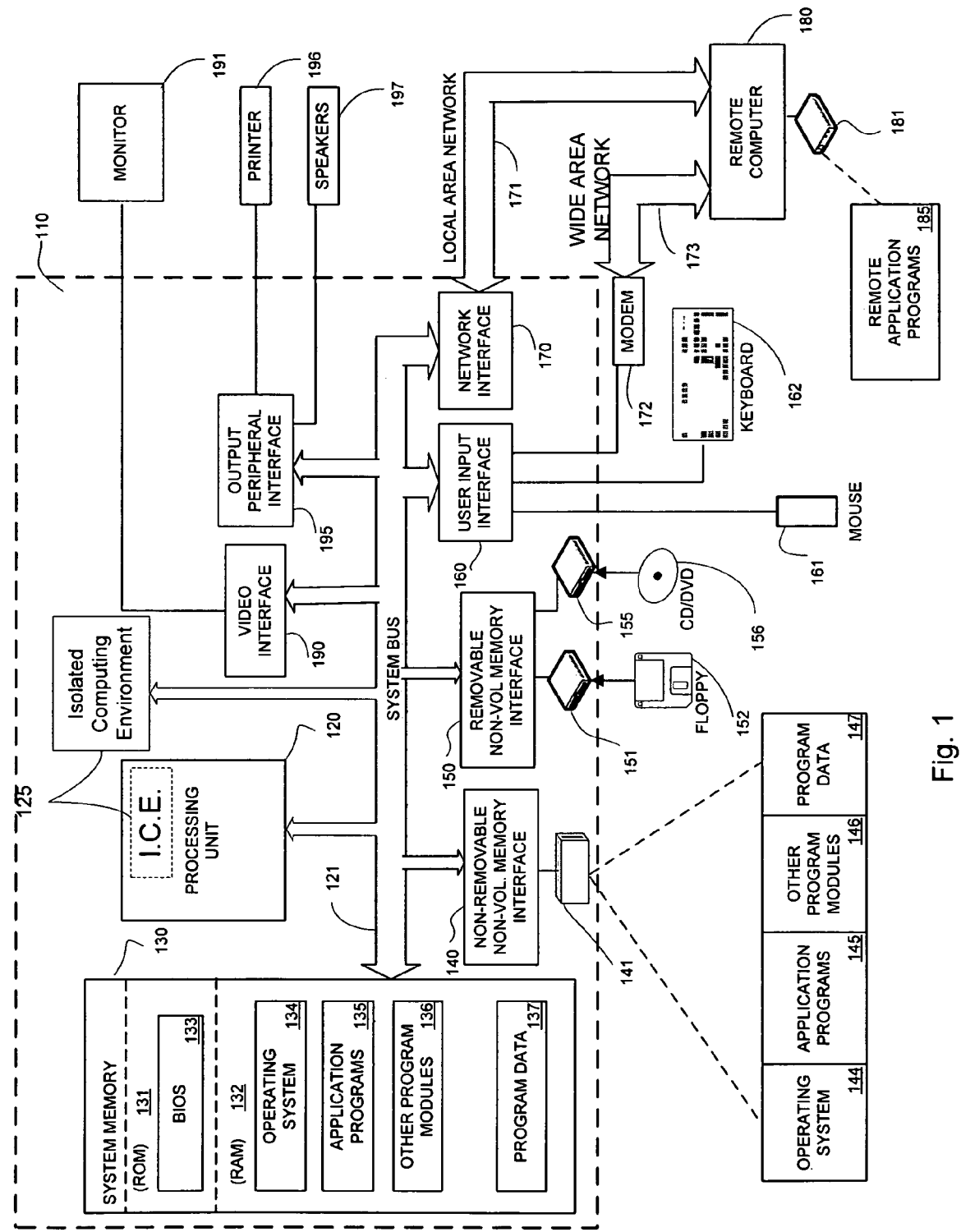
FIG. 1 is a simplified and representative block diagram of a computer.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

The use of an isolated computing environment allows a service provider, such as an Internet service provider, leasing agency, bank, etc, to enforce certain policies on a computer even when the computer is out of the physical control of the service provider. To be effective, the isolated computing environment may require a certain level of trust that implies that the isolated computing environment be programmed in a trusted environment or maintain a chain of trust back to a secure environment.

As mentioned though, early programming, where the required security environment may be easier to establish and maintain, may restrict the isolated computing environment to a limited set of computing platform options. A combination of early setup and late programming or configuration aids the flexibility of the isolated computing environment while helping to ensure its security.

FIG. 1 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. The term "module" includes a machine and/or software in any combination of hardware and/or software capable of implementing and/or storing the disclosed functionality. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.Computer storage media and/or communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 2:
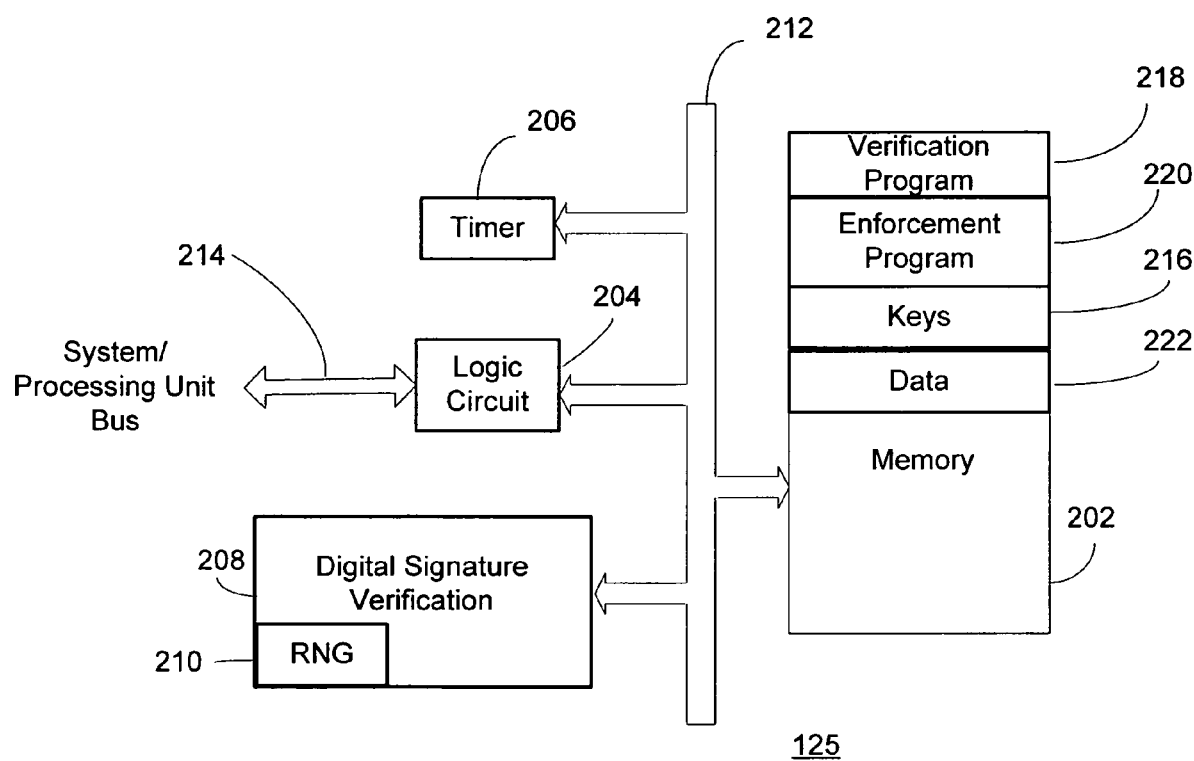
FIG. 2 is a block diagram of a simplified isolated computing environment.

The isolated computing environment 125, discussed in more detail with respect to FIG. 2 may store and cause execution of programs and data. The isolated computing environment 125 may be deployed and configured to enforce the terms of an agreement between a user of the computer 110 and a service provider with an interest in the computer 110.

The isolated computing environment 125 may be instantiated in more than one manner. When implemented by one or more discrete components, the isolated computing environment 125 may be disposed on the motherboard (not depicted) of the computer. The motherboard may be any circuit interconnect and component mounting base technology suitable for a given application and may range from a fiberglass material, to molded epoxy resin, mylar, ceramic, etc. When the isolated computing environment 125 is disposed on or in the motherboard, the isolated computing environment 125 may be coated in an epoxy or buried beneath interconnect layers or components. Coating or burying the isolated computing environment 125 may serve to increase the difficulty of removing or tampering with the isolated computing environment 125 itself, associated power and ground connections to the isolated computing environment 125 or data and address connections to the isolated computing environment 125. Ideally, the removal or de-lidding of the isolated computing environment 125 causes permanent damage to the motherboard and/or surrounding components and renders the computer 110 inoperable.

Another instantiation of the isolated computing environment 125 may be as depicted in FIG. 1, where the isolated computing environment 125 is incorporated in the processing unit 120. Being so disposed in the processing unit may offer advantages of better access to processing unit registers and monitoring of data sequences as well as improved resistance to physical attacks.

Referring to FIG. 2, a simplified and representative isolated computing environment is discussed and described. The isolated computing environment may be or may be similar to the isolated computing environment 125 introduced above. The isolated computing environment 125 may include a memory 202, a logic circuit 204 and a clock or timer 206, for example, the timer 206 may be used to implement a clock by counting intervals of real time. The memory 202 may include both volatile and non-volatile memory.

The isolated computing environment 125 may further include a digital signature verification circuit 208. When one-way verification of an external entity is required, for example, verification of a server (not depicted), a random number generator 210 may be a part of the digital signature verification circuit 208. Digital signature technology is well known and hashing, signature verification, symmetric and asymmetric encryption algorithms and their respective keys are not discussed here in detail.

The blocks of the isolated computing environment 125 may be coupled by a bus 212. The bus 212 may be separate from a system or processing unit bus 214 used for external access. Separate busses may improve security by limiting access to data passed by bus 212. The bus 212 may incorporate security precautions such as balanced data lines to make power attacks on cryptographic keys 216 stored in the memory 202 more difficult.

The memory 202, may include non-volatile memory that, in addition to storing cryptographic keys 216, may store at least one verification program 218 and at least one enforcement program 220. These programs are discussed in more detail below. Other data 222 may be stored in the memory 202, for example, hash codes and/or other digital signature information associated with known BIOS code or application programs. Other examples of data 222 that may be stored in memory 202 may be compliance data pertaining to the current state of the computer 110 or certificate information for verification of downloaded updates to verification programs 218 or enforcement programs 220. Non-volatile memory in the memory 202 may also allow a trusted, secure, boot process separate from the operating system 144.

The validation and enforcement programs 218 220 are shown stored in the isolated computing environment 125, but may also be stored externally, with a digital signature or hash of the programs stored in the isolated computing environment 125, for example, in the data section 216 of the memory 202. Alternatively, digital signatures may be stored out of the isolated computing environment 125, possibly attached to these programs as metadata. When monitoring or measuring an application program, the isolated computing environment 125 may validate a hash or digital signature of the application program before or during the program's execution. Since the programs 218 220 and data stored in memory 202 are part of the security associated with the success of the pay-as-you-go, pay-per-use business model, it may be important that the data be protected from unauthorized access and tampering. Unauthorized access of the memory 202 may be limited using either the logic circuit 204 or the digital signature verification circuit 208 or a combination of the two. The access to the memory may be restricted to processes running a known program code, i.e. a program code trusted by the isolated computing environment 125. The program code may be the validation program 218 or the enforcement program 220. However, other programs may be granted access to the memory 202. For example, an application supporting the management of usage credits or balances may use the memory of the isolated computing environment 125. When repair or maintenance is required, access to the memory 202 may be granted to a service process supported on a networked device having proper credentials in order to effect the repair.

The isolated computing environment 125 may have several functions. One function of the isolated computing environment 125 is to protect itself from unauthorized updates and tampering. Programs and data stored in the isolated computing environment 125 may be injected at the time of manufacture or may be downloaded if correctly signed with the signature authenticated by the isolated computing environment 125 itself. Another function may be to monitor and/or measure the state of the computer 110 to determine if a hack or other unauthorized change in the state of the computer 110 is in process or has occurred. Another aspect of monitoring and measuring may be to support legitimate changes of state of the computer 110 related to functions associated with provisioning resources and hosting secure functions such as an event dispatcher or balance manager. A third function may be to validate current BIOS code and validate updates and extensions to BIOS code. Another function of the isolated computing environment 125 may be to provide a reliable clock or timer both as a source of time for metering programs and expiration dates. The clock or timer may also ensure that the isolated computing environment 125 is routinely granted access to the computer 110 and not "starved" for CPU or bus cycles. Another function may be to enforce sanctions when a non-compliant state is determined in the computer 110.

Yet another function of the isolated computing environment 125 is to serve as an independent supervisor observing the computer usage and making sure it complies with the business terms and policies put forth by the provider or legal owner. Pay-as-you-go and subscription computers are examples of such technology.

To protect from unauthorized updates and tampering the memory 202 may be secured. To accomplish this, the memory 202 may be made accessible only to a specific program, for example, an update routine authenticated by a digital signature under the control of a secure operating mode of the computer 110. The memory 202 may be made inaccessible to any program executed by another execution environment such as the operating system or the kernel. The kernel typically runs when the computer 110 is booting. By way of example, x86 processors from Intel™ can be operated in several modes, or rings of execution. Ring 0-2 are occupied by the kernel, Ring 3 is occupied by "user mode" processes. A third mode SMM (system management mode) is occupied by the BIOS. The program with access to the secure memory 202 may be run in the SMM because it is out of reach of the kernel, but would require securing the BIOS. Alternatively, the isolated computing environment 125 may be implemented independently from the CPU using a dedicated device.

For security of the isolated computing environment 125, devices other than the isolated computing environment 125 may simply not be able to address the physical memory dedicated to the isolated computing environment memory 202. This is only one way to ensure that only the isolated computing environment can access and alter any of the data associated with the operation of the isolated computing environment memory 202, including programs 218, 220, keys 216 and state/operational data 222. The digital signature verification circuit 208 may be used to verify all requested changes to the memory 202 that come from outside, that is, through the operating system 144. By confirming digital signatures using internally stored keys, trust can be established for data received by an untrusted source, i.e. the operating system 144.

Figure 3:
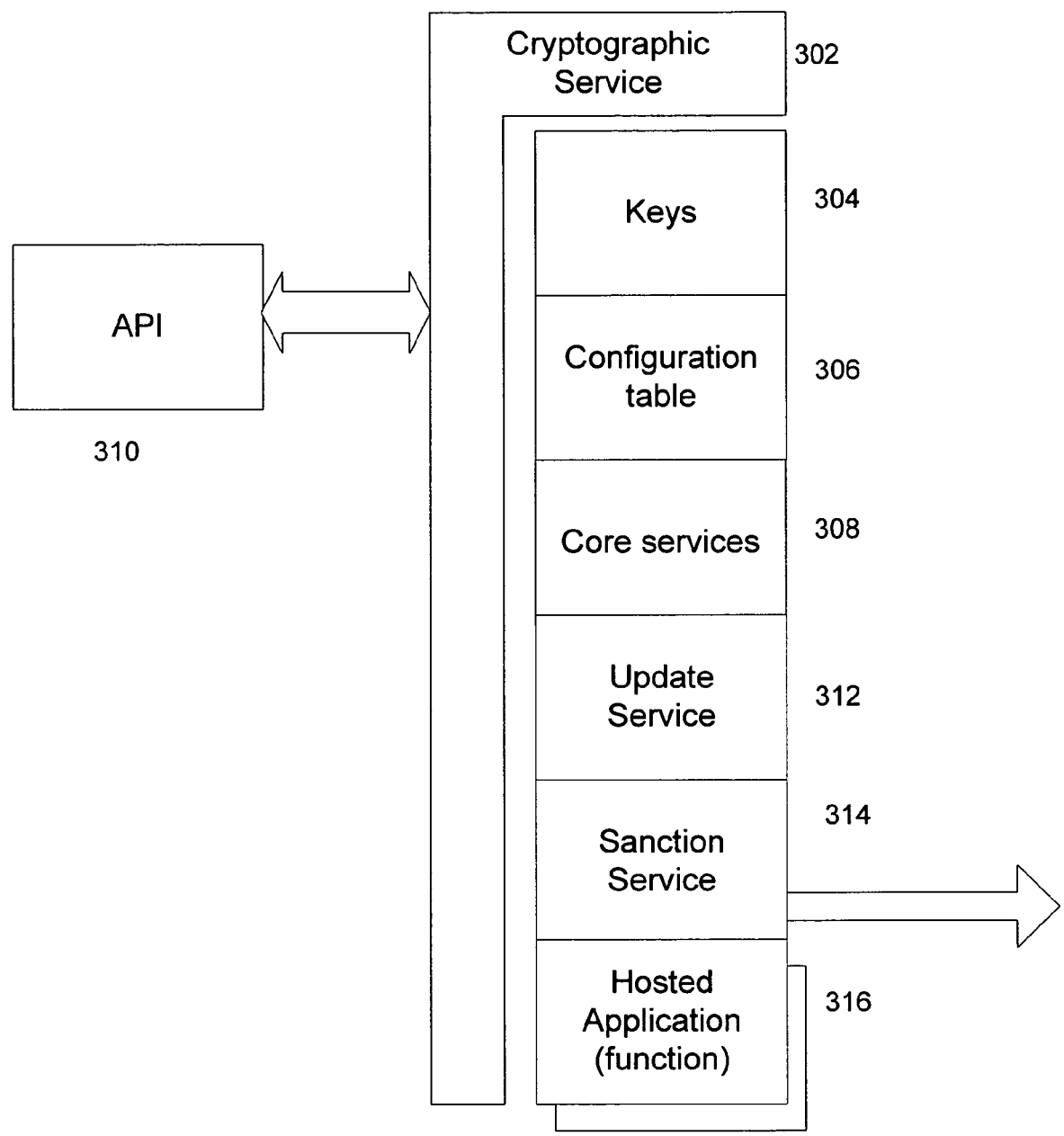
FIG. 3 is a simplified and exemplary block diagram illustrating the functional relationship between isolated computing environment services.

FIG. 3 depicts a logical view of the isolated computing environment 125. A cryptographic service 302 acts to protect the inner layers or services from tampering or unauthorized access. Cryptographic keys 304 may be stored in secure memory, such as memory 202 of FIG. 2. A configuration table 306 and core services 308 may be used to program the features and functions of the isolated computing environment 125. An application program interface (API) 310 may be used to support bidirectional data transfer with the isolated computing environment 125. By using an application program interface 310, a command set of valid communications may be limited to a particular format, schema and/or security policies. In this fashion, data transmissions that do not conform to a pre-defined set of characteristics may be rejected without further processing. For instance, a message with a payload that updates some aspects of the ICE, is required to be digitally signed by a trusted authority.

An update service 312 may be used to change the keys 304, the configuration table 306, and core services 308 responsive to an authentication of a received message. A sanction service 314, the same or similar to the enforcement program 220 of FIG. 2, may be triggered to limit functionality of the computer 110 either while being transported after initial manufacture, or after a non-conforming condition is identified during normal operation. The sanction service may use an activation mechanism to impede the function of the computer. The activation mechanism may be embedded in a bus driver or clock circuit, or may be a component of the silicon of the microprocessor (not depicted), such as microcode. Alternatively, the activation mechanism may be periodic resetting of the computer. In one embodiment, the period between resets varies randomly but may, in general, be long enough to allow diagnostic and maintenance functions to be performed. The activation mechanism and its physical manifestation may be made to be tamper-resistant, since disabling the activation mechanism could be used to defeat the sanction.

A hosted application 316 or other functional program may associated with the isolated computing environment 125. The hosted application 316 may be installed initially in the isolated computing environment 125 or may be instantiated later, for example late in manufacturing, at a retail center, or after delivery to a customer. The hosted application 316 may be associated with metering of a pay-per-use computer, may act as a watchdog on measured functions, or may be any application, function or resource where a measure of security is desirable. More than one hosted application 316 may be supported by a single isolated computing environment 125 (When the isolated computing environment 125 is, referred to as an ICE, hosted applications may be referred to as icicles.)

The relationship between the core services 308 and the hosted application 316 may change depending on application and with time. For example, in one embodiment, the core services 308 may control updates the isolated computing environment 125, that is, act as the gatekeeper for updates, etc. In another embodiment, the hosted application 316 may act as the gatekeeper. In yet another embodiment, the core services 308 may cede or delegate gatekeeping responsibilities to the hosted application 316 upon presentation of a token. Though complex, another embodiment may share the gatekeeping responsibilities between the core services 308 and hosted application 316.

The update service 312, responsive to a validated message received via the application program interface 310, may be used to update or reprogram entirely the core services 308, the configuration table 306, the keys 304 and/or the hosted application 316. When updating the core services 308, one or more operating routines may be updated. The operating routines may affect measurements made on the computer 110 and sanctions imposed during end-user operation. Updates to the configuration table 306 may include payment schedules, measurement criteria, default settings, etc. Updates made to the keys may be to replace old keys or install new keys to allow confirmation of subsequent messages. Therefore, the data received in a validated message may include any or all of routines used by the core services 308, configuration table 306 settings, hosted applications 316, or keys 304. To prevent reloading a previous version of an update, especially one that may have been compromised, sequence numbers or timestamps may be used as part of the validated message.

Figure 4:
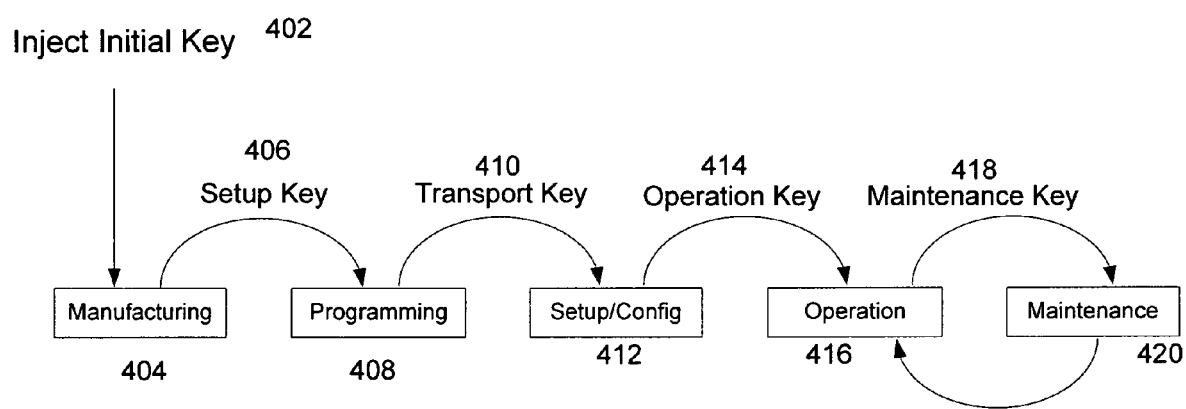
FIG. 4 is a block diagram illustrating a system for successive programming of an isolated computing environment.

FIG. 4 depicts representative life-cycle stages in a computer, such as computer 110. Also shown are representative interim cryptographic keys that may be used in protecting secure areas of the computer, such as the isolated computing environment 125. Early in the manufacturing process, as early as chip testing, an initial key 402 may be injected into the computer 125 or a component thereof. Injection usually occurs by writing directly to the memory circuit 202, often before it is surrounded by enough protective circuitry and physical hardening to protect the memory 202 from such a direct writing process.

After manufacturing 404, the initial key 402 may be replaced by a setup key 406. The setup key 406 may be shared between the manufacturer, or a sub-process thereof, and a programming phase 408. During programming, an operating system and applications may be installed. Localization may occur if the final destination of the computer 110 is known. In some trusted environments, the isolated computing environment 125 may be left open during manufacturing, allowing a more standard isolated computing environment to be installed. Binding to particular operating systems and functional environments may then be deferred without the limitations imposed by cryptographic locks. In one embodiment, the installation and setup of the operating system may be tied to setup and programming of the isolated computing environment 125. In another embodiment, all isolated computing environments may be given a standard key or group key allowing all machines in that group to be programmed with a single key. A unique identifier programmed into the isolated computing environment 125 may then be used to distinguish and personalize the cryptographic keys and environment for each separate isolated computing environment 125. During programming 408, an interim cryptographic key 410 may also be installed. The interim key 410 may be shared between the programming operation and the setup/configuration operation 412. Setup/configuration 412 may be a retail delivery center or may be a service provider staging area. During setup and configuration, individual user accounts may be programmed, email services established, Internet connectivity programmed, and in the case of a pay-per-use computer, the usage plans and initial operating credits may be installed.

During the setup/configuration process, an operation key 414, and in some cases a maintenance key 418 may be installed. The operation key 414 or keys may not be shared with the end user, but the operation key(s) may reside in the computer 110, or more specifically, may be stored in the isolated computing environment 125. Several sets of symmetric keys may be installed in a symmetric key encryption environment, or a root certificate and a public key may be installed if asymmetric cryptography is used. The computer may at this point be ready for beneficial operation 416 by an end user. In the course of operation 416, maintenance may be required. If special access is required, the operation key 414 may be bypassed and the maintenance key 418 used to place the computer 110 into a special maintenance mode 420. When the maintenance process 420 is complete, the computer 110 may be returned to the operation mode 416.

The operation key 414 may be used in normal operation, for example, to add value to a pay-as-you go account. Other special purpose keys may be installed at any point for supplemental uses, including but not limited to, digitally signed updates. At each stage of the manufacturing and delivery process, the code in the core services 308, the configuration table 306 and keys 304 may be updated to reflect operations performed at that stage, or to allow activity scheduled for the next stage. The key management process used in such sequential processing is known in the industry.

At each step in the lifecycle of the computer 110 or a computing environment such as an isolated computing environment 125, trust may be established by the use of the keys installed and tokens presented for authentication. By presenting acceptable tokens, such as a digitally signed update, trust is established with the sending party. Only early in the manufacturing process must the computer 110 or the isolated computing environment 125 rely on the supporting environment for a trusted action, such as the injection of the initial key 402. Beyond that initial trusted environment, the computer 110 or the isolated computing environment 125 would not be expected to trust a priori any data presented.

Furthermore, the isolated computing environment may authenticate the request and validate its authorization. For instance, it may apply varying policies to updates and installations of the various isolated computing environment components. For example, updating the core service and configuration service may be granted to a very tightly controlled group whereas updating a hosted application is granted to its authors.

Any time after initial programming of the isolated computing environment 125 and injection of an initial key 402, for example at the manufacturing 404 step, the isolated computing environment 125 may impose a sanction on the computer 110. The sanction may limit functionality to a minimum set of useful routines or services suitable for completing later steps in the programming and setup of the computer 110, but sufficient to prevent beneficial use by an end user. Sanctions may include persistent resets, reduced instruction sets, slowed operation, minimized screen area or color, etc. and the sanctions may change during the stages of delivery. These early sanctions may be lifted when the isolated computing environment 125 is updated with core services 308, configuration table 306 settings, and keys 304 suitable for end-user operation. As part of the verification of the configuration of the computer 110, or more specifically, the isolated computing environment 125, a characteristic of the core services 308 may be digitally verified. For example, the verification may use a digital signature or hash and a previously established trust token, such as a root certificate or known hash.

When instantiation, programming and setup occur as a series of steps, for example, by successive installation of appropriate software modules, the sanction may be lifted by the installation of the "last" module. That is, the last module may determine that the underlying modules are installed and intact and may then lift the sanction.

Alternatively, a sanction may not be imposed until later in the manufacturing or customer fulfillment process. In one embodiment, the sanction service 314 monitors a trigger event, such as a number of resets, a calendar date or days-since-built, before activating a sanction if the isolated computing environment 125 is not updated.

Figure 5:
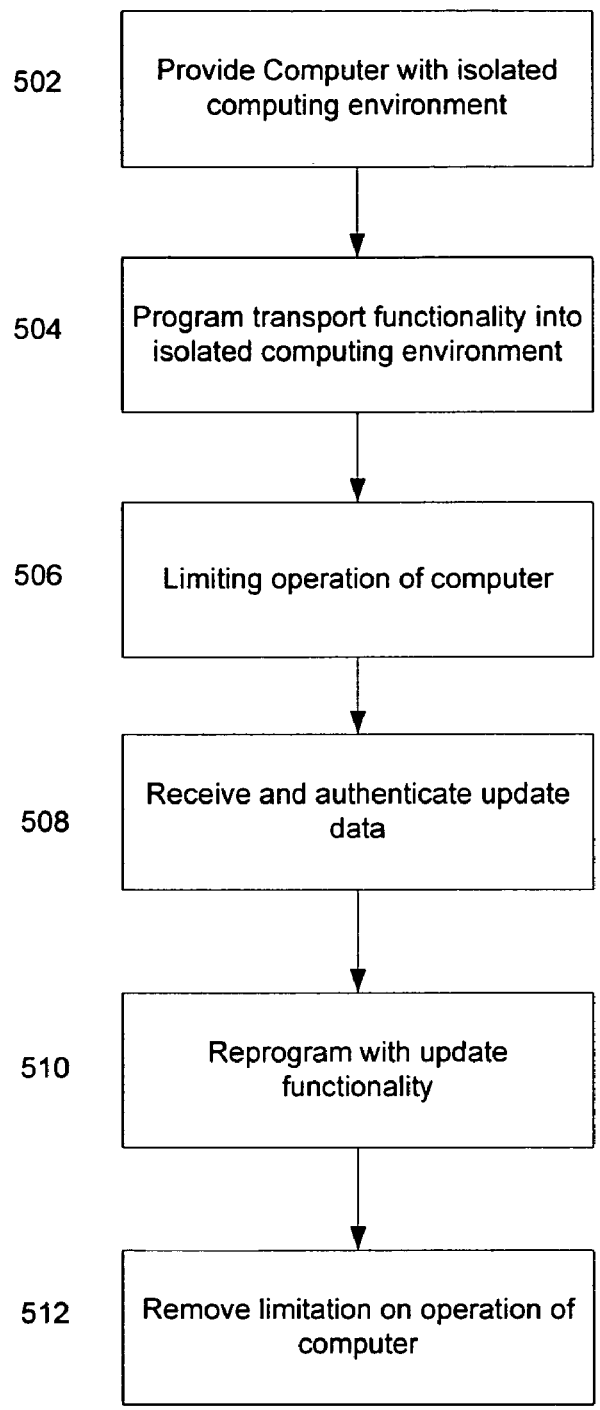
FIG. 5 is a flow chart depicting a method deferring programming and setup of an isolated computing environment.

FIG. 5, a flowchart depicting a method for deferring programming in an isolated computing environment of a computer is discussed and described. A computer, such as computer 110, is provided 502. The computer may include a physical isolated computing environment or the isolated computing environment may be implemented by the operating system. In general, a hardware isolated computing environment may be more secure from tampering and attack.

Prior to delivery to the end-user, preferably early in the manufacturing process, the isolated computing environment may be programmed 504 with transport functionality. Transport functionality may be limited to capabilities enabling the current and/or subsequent steps toward customer delivery, but may not include final, end-user, functionality. Programming the transport functionality may include programming a transport cryptographic key, such as keys 406, 410, and at least a download function in the core services 308. The download function may enable subsequent download of intermediate functionality or end-user functionality.

To help enforce completion of the manufacturing and delivery cycle, operation of the computer may be limited 506 or reduced. Many options are available for limiting computer operation, as discussed above and in the priority documents referenced, and may include reducing the functionality of the processing unit 120 or periodically resetting the computer 110.

An incoming message may be received and authenticated 508. The data may correspond to updated functionality or other data settings such as keys 304, core services 308 or configuration data for updating the configuration table 306. The isolated computing environment may be reprogrammed 510 with the authenticated data. The data may include its own security token, such as a digital signature, or the isolated computing environment may establish an authenticated session using the transport key with a host to verify the authenticity of the data. When operation-level code is installed and verified, the sanctions associated with the transport configuration of the computer 110 may be removed 512, allowing beneficial use by a user.

By following a process such as that described above, an isolated computing environment 125 or other secure environment may be secured early in the manufacturing process where the opportunity to corrupt the isolated computing environment is kept low. Other intermediate manufacturing and deliver operations may be authorized to make updates and changes to the extent that each step can prove its right to make changes by presenting the appropriate key. Final updates to the configuration table 306 and core services 308 allow the isolated computing environment to be used across a wider range of computer configurations, operating systems, and localizations. At the same time, the isolated computing environment maintains enough functionality to support manufacturing and delivery but preserves its integrity/trustworthiness through the use of intermediate cryptographic keys.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. An isolated computing environment module configured for use in a computer and for maintaining security of data hosted by the isolated computing environment module, the isolated computing environment module comprising:

an initial manufactured security state of the data hosted by the isolated computing environment module, wherein the data is stored in volatile memory;

a core service module configured to control access to the data hosted by the computer;

an interface module configured to receive a message and provide information provided by the message to the core service module, the message comprising at least one of an update code or configuration information;

a cryptographic service module, coupled to the core service module, and configured to access a first key and to verify a digital signature of the message using the first key before allowing access to the data; and an update service module configured to update the core service module responsive to the information provided by the message after verification of the digital signature of the message using the first key, and configured to use a second key configured for use in a production of a programmed security state of the data and a later verification by the cryptographic service module, wherein the programmed security state of the data includes kernel data other than the data of the initial manufactured security state.

2. The isolated computing environment module of claim 1, further comprising a configuration table, wherein the update service module updates the configuration table, responsive to the message comprising the configuration information.

3. The isolated computing environment module of claim 1, further comprising a sanction service module for limiting a module of the computer.

4. The isolated computing environment module of claim 3, wherein the sanction service module limits the module of the computer prior to the update of the core service module responsive to the message verified by the first key.

5. The isolated computing environment module of claim 1, further comprising a hosted application, wherein the message comprises at least one of a core service update data or a hosted application update data.

6. The isolated computing environment module of claim 1, wherein a characteristic of the core service module is digitally verifiable.

7. The isolated computing environment module of claim 1, further comprising an application program interface module, the application program interface module configured to provide a standard interface between the computer and the isolated computing environment module facilitating one of instantiating an application hosted on the isolated computing environment module, and to configure an application hosted on the isolated computing environment module, and to update the isolated computing environment module.

8. A computer adapted to operate using an isolated computing environment module, the computer comprising:

a processor;

a memory coupled to the processor for storing processor-executable instructions; and an isolated computing environment module configured to respond to signals sent via an application program interface module, the isolated computing environment module comprising:
- a cryptographic module configured to produce a verification of a first key, and to verify a digital signature of the signal using the first key before allowing access to the data hosted by the isolated computing environment module;
- a processing module, coupled to the cryptographic module, and configured to control access to the data;
- a secured memory configured to store the data including a first data instantiated during a manufacturing phase of production of the isolated computing environment module; and
- an update module configured to use a second key, after the second key has passed a second verification by the cryptographic module, to update the data of the secured memory with a second data including, kernel data instantiated during a second phase of the production of the isolated computing environment module, which is other than the manufacturing phase.

9. The computer of claim 8, further comprising a bidirectional data transfer port, wherein data received via the bidirectional data transfer port includes at least one of a second executable code or a second configuration.

10. The computer of claim 8, wherein the application program interface module comprises a first routine for updating the first data.

11. The computer of claim 8, wherein the application program interface module comprises support for a secure data transfer connection to the isolated computing environment module.

12. The computer of claim 8, further comprising a trigger mechanism, coupled between the computer and a sanction circuit, configured to impede a module of the computer.

13. The computer of claim 12, wherein the trigger mechanism is tamper-resistant.

14. The computer of claim 8, wherein the trigger mechanism comprises one of a persistent reset module a processor reduction module.

15. A method of providing security for data maintained by an isolated computing environment module in a computer, the method comprising:
- programming provisional data into the isolated computing environment module during a manufacturing phase;
- controlling access to the data via a cryptographic service module;
- receiving a message including a first key configured for use by the cryptographic service module;
- verifying the first key and a digital signature by the cryptographic service module to produce a verification result indicating a grant of access to the data;
- providing a second key;
- using the second key to access the data of the provisional data;
- reprogramming the data of the provisional data with kernel data during a phase of production of the isolated computing environment module which is not the manufacturing phase.

16. The method of claim 15, further comprising limiting a module of the computer when the verification result does not indicate the grant of access.

17. The method of claim 15, wherein programming the provisional data into the isolated computing environment module comprises a download module.

18. The method of claim 17, wherein reprogramming the isolated computing environment module with the kernel data comprises authenticating the source of the kernel data.

19. The method of claim 17, wherein reprogramming the isolated computing environment module with the kernel data comprises authenticating the source of the kernel data using the second key.

20. The method of claim 15, further comprising limiting an operation of the computer, wherein limiting the operation of the computer comprises at least one of reducing functionality of a processor and resetting the computer.

* * * * *